United States Patent Office 3,639,335
Patented Feb. 1, 1972

3,639,335
THERMALLY-STABLE POLYAMIDE COMPOSITIONS
Shigeru Fujii and Iso Saito, Nagoya, Japan, assignors to Toray Industries, Inc., Tokyo, Japan
No Drawing. Filed June 12, 1970, Ser. No. 45,897
Int. Cl. C08g 51/58, 51/62
U.S. Cl. 260—45.75 C                      19 Claims

ABSTRACT OF THE DISCLOSURE

Nylon compositions which are formed from polyamides such as polycaprolactam have improved heat and light stability by incorporating a copper salt derived from the reaction of a coper halide and xylenediamine. The resulting polyamides which are color-free may optionally contain a hindered phenol antioxidant.

---

This invention relates to nylon compositions. More particularly, the invention relates to nylon compositions which exhibit improved heat stability and light resistance, and are free from coloring.

Nylon has been widely used as fiber and other shaped articles, because of its excellent polymer characteristics, but it has relatively low resistance to heat and light, and is apt to show deterioration in strength-elongation, and yellowing. Numbers heat stabilizers and light resisting agents have been announced to be useful for improving this defective property of nylon, the copper salts being most widely used for their particularly conspicuous effect. However, the addition of copper salts causes coloring of nylon, incurring serious restrictions on the utility of such nylon. That is, the nylon yarn of which heat and light resistance have been improved by the addition of copper salts are normally colored light blue, light green, or light, reddish violet, etc. Such colors interfere with dyeing. For this reason such colored nylon yarn cannot be used for clothing, upholstery, etc., although it is obvious that improved heat and light resistances are valuable properties also in those fields.

Prior art in this line include use of copper salts of organic compounds proposed by British Pat. No. 652,942. Addition of ordinary copper salts, however, causes coloring of the polymer to light blue or red, particularly at the time of high temperature (280° C. or above) spinning. Again, copper salt alone normally shows insufficient solubility in polymer, which incurs a quantitative limitation on the use of copper salt and provides a cause of drawability deterioration.

Examples of concurrent use of copper salts and inorganic halides include U.S. Pat. No. 2,705,227 and British Pat. No. 908,647. In those inventions the additives solubility in the polymer is improved over the case of adding copper salt alone, and polymer coloring (light blue) is lightened. However, the effects are yet not quite satisfactory.

Addition of copper salts and organic substances is proposed by, for example, British Pat. No. 945,186 and U.S. Pat. No. 3,275,594, whereby the heat stability of nylon composition is notably improved. However, the composition is liver-colored or brown, and is useful only in limited field.

Use of phenolic antioxidants is proposed, for example, by U.S. Pat. No. 2,806,732 and British Pat. No. 717,698, but the antioxidants are not used for the purpose of preventing coloring of the copper salts in the polymer. Generally speaking, phenolic antioxidants are ineffective under severe using conditions. For instance, they fail to sufficiently improve the heat stability of tire yarn.

Use of copper complex salts is known according to British Pat. No. 922,706, and it is also mentioned in an older literature, U.S. Pat. No. 2,705,227. The former British patent proposes the use of halogenated copper complex salts of primary and secondary amines, but is entirely silent as to the prevention of coloring of the polymer. In fact, not all copper complex salts exhibit an anti-discoloration effect. The subject invention is therefore considered to be not anticipated from those prior arts. The invention furthermore is different from said British Pat. No. 922,706, in that the invention employs copper complex salts of aromatic amines (more precisely, amine compounds of alkylbenzene), while the prior art uses, strictly speaking, copper complex salts of aliphatic amines.

Thus, the first object of the present invention is to provide nylon compositions which are free from coloring by the addition of copper complex salts, and which neverfrom any utility limitation as above-described.

Still another object of the invention is to provide nylon compositions of stabilized color tone suited for all utilities, which are not colored by the addition of copper complex salts, and which are not colored even in the molten state under high temperature because thermal decomposition is less likely to occur under high temperature.

According to the subject invention, nylon compositions are provided which heat and light resistances are improved by the addition of copper complex salts, and which nevertheless are not colored but are substantially equally water-white when compared to the nylon containing no copper complex salt.

We studied the causes of nylon coloring due to the addition of copper salts, and concluded that the causes can be largely classified by the following two categories. The first is decomposition of the copper salt during the melting treatment to form copper oxide or basic copper oxide, and the second is the presence of free copper ion and/or copper ion linked with the nylon. For example, such copper complex salts as copper phthalocyanine and copper salicylaldehyde are themselves color-developing.

Therefore, in order to eliminate such causes as above and to prevent coloring of nylon compositions under addition of copper salts, it is necessary to select copper salts of high heat stability at the time of melting and which do not show color-developing property in the nylon. We confirmed that the valency of copper ion, the type of anion which serves as the counter ion, and the state of coordination bond of copper ion with amide linkage are the important factors for achieving the above purpose. Based on the knowledge, we carried out extensive comparative tests, and discovered that the coloring of nylon can be substantially completely prevented by using copper complex salt of cuprous or cupric halogenide with xylylenediamine as the copper compound to be added to nylon. When the specified copper complex salt is added to nylon, water-white nylon composition of improved heat and light resistances can be obtained.

We furthermore discovered that while copper ion forms a complex salt with the amide linkage, the salt may be colored due to its chemical structure. Normal coordination of copper complex salt is a 2-molar coordination form for the cuprous salt, and a 4-molar coordination form for the cupric salt. Because copper ions are not completely coordination-bonded with amide groups in nylon, water molecules can be coordinated at the vacant linkage positions. Such copper complex salts containing water molecules tend to be colored blue. Therefore, the objectionable coloring can be inhibited by, either coordination bonding the copper complex salt in nylon in such a manner as will leave no vacancy for water molecules, or forming the copper complex salt with a compound of relatively large bulk. However, most of the copper complex salts have undesirably high hygroscopicity. Due to this defect, the copper complex salt added to nylon may cause the formation of bubbles or voids during shaping of the composition, often showing as the consequence such detrimental effect as degradation of the nylon.

According to the invention, heat and light resistances of nylon are improved by the addition of a specified copper complex salt, and furthermore the resulting nylon composition is not colored but is as white as the nylon containing no copper complex salt. Furthermore there is no danger of increasing hygroscopicity of the composition by the addition of the copper complex salt. Thus degradation of nylon never occurs.

Such advantageous nylon compositions can be formed, as already mentioned, by adding copper complex salts of copper halogenides with xylylenediamine to nylon. We found, however, that when such nylon compositions are molten at high temperatures to be shaped into fiber and other articles, the products show slight coloring in certain cases which is discernible to the naked eye, if not very conspicuous. We studied such cases to find that the coloring is caused by the copper ion which has become dissociated by thermal decomposition of a part of copper complex salt under the high temperature melting.

Our further study confirmed that such coloring is developed when the compositions are exposed to high temperatures of melting operation in shaping, etc. and can be substantially completely prevented, by concurrent addition of hindered phenols with copper halogenide-xylylenediamine complex salt, to nylon. The resulting composition is almost as white as nylon containing no copper complex salt. Such excellent whiteness furthermore remains unchanged after prolonged exposure to heat and light. The working mechanism of hindered phenols is unknown, but it is presumable that the cause of coloring due to the addition of copper complex salt is correlated with the thermal stability of the salt, that nylon possesses certain detrimental effect on that thermal stability, and that hindered phenols probably affects those properties in favorable manner. We found that preferably the hindered phenol has at least two benzene rings, also at least two phenolic hydroxyl groups, and a molecular weight of at least 200.

As the cuprous halogenides useful for the invention, cuprous chloride, bromide and iodide may be named, cuprous chloride and iodide being particularly preferred. The cuprous complex halogenides employed in the invention contain one mol of xylylenediamine per mol of copper ion. The cuprous complex salts can be synthesized in various ways. For example, they may be obtained as a light blue or grey precipitate, by adding xylylenediamine to the solution of cuprous halogenide in aqueous alkali halide. The precipitate recovered as copper complex salt may contain the alkali halide employed in its preparation, without any detrimental effect on the achievement of this invention.

As the cupric halogenides useful for the invention, cupric chloride and bromide may be named, the former being more preferred. As xylylenediamine, any of ortho-, meta-, and para-xylylenediamines and their mixtures can be used. The cupric halogenide-xylylenediamine complex salts employed in the invention contain one mole of xylylenediamine per mol of cupric halogenide. If the salt contains 2 mols of xylylenediamine per mol of cupric halogenide, a substantially equal effect can be obtained when all the coordination valences of cupric linkage are filled. The complex salt can be synthesized, for example, by adding xylyenediamine to solution of cupric halogenide in ethanol. The salt is recovered as a light blue or green precipitate from the described system.

The hindered phenols useful for the invention include, for example, 2,2'-ethylidenebis(4-methyl-6-t-butylphenol),
4,4'-methylenebis(5-methyl-2-t-butylphenol),
4,4'-dihydroxydiphenylcyclohexane,
1,1,3-tris(4-hydroxy-6-methyl-3-t-butylphenyl)butane,
tetrakis[3-(4-hydroxy-3,5-di-t-butylphenyl)propionyloxymethyl]methane,
2,4,6-tris(4-hydroxy-3,5-di-t-butylbenzyl)-1,3,5-trimethylbenzene, and the like. Among the above-named, tetrakis[3-(4-hydroxy-3,5-di-t-butylphenyl)propionyloxymethyl]methane and 2,4,6-tris(4-hydroxy-3,5-di-t-butylbenzyl)-1,3,5-trimethylbenzene are the most preferred. Such hindered phenol is used in suitable quantity according to the intended utility of the product, within the range of 0.005–0.3 percent by weight to the nylon. Addition of more than 0.3 wt. percent is unnecessary because the corresponding improvement in its effect can no more be expected. Also, the hindered phenol exceeding the specified limit stays in spinning machine for abnormally long line, and the detrimental effect of its decomposition product on spinnability of the polymer is by no means negligible. Again, if the hindered phenol is relatively stable under the thermal treatment in the spinning machine, it promotes deterioration (gelatinization) of coating silicone (polyorganosiloxane-methyl phenyl silicone, dimethylsilicone, etc.) daubed on the spinneret, consequently impairing the parting property of the silicone.

Generally speaking, cuprous halogenide-xylylenediamine complex salts are more useful than cupric halogenide-xylylenediamine complex salts for the purpose of this invention, because the latter exhibit considerably greater hygroscopic property than that of the former, and thus more of the latter salts develop color due to moisture absorption. Therefore when cupric halogenide-xylylenediamine complex salts of high hygroscopicity are used, they shoul desirably be added in the state protected from moisture absorption. With such care, an effect approximately equivalent to that of the cuprous halogenide-xylylenediamine complex salt can be obtained.

In accordance with the invention, more favorable heat and light resistances and coloring stability are obtained by the addition of 0.0001–0.3 wt. percent of copper halogenide-xylylenediamine complex salt, calculated as the copper, to nylon. For the nylon compositions for clothing use wherein relatively minor improvement is practically sufficient, addition of 0.0001–0.003 wt. percent will achieve the desired effect. While for those of industrial use wherein the products are apt to be exposed to more severe conditions, addition of 0.001–0.3 wt. percent of the copper complex salt is necessary. Addition of more than 0.3 wt. percent is unnecessary because improvement in heat stability corresponding to the addition of such large amount of the salt cannot be expected. Moreover, when the copper complex salt exceeds 0.3 wt. percent, the polymer develops objectionable color, contrary to the purpose of retaining whiteness of the polymer. Furthermore, spinning problems such as reduction in drawability, accumulation of decomposition product in the spinning machine, etc. are caused by the thermal decomposition of the stabilizers.

The present invention is applicable to nylon-6 nylon-6,6, nylon-12, nylon-6,10, and aromatic nylon, as well as to other various copolymerized nylon, nylon blends, etc. The above nomenclature corresponds respectively to polycaprolactam, polyhexamethylene adipamide, polydodecalactam and hexamethylene sebacamide. The additives specified in this invention can be concurrently used with known delusterants such as titanium oxide, antistatic agent, fluorescent brightening agent, etc., without any adverse effect.

The nylon compositions of this invention can be used for various shaped articles, particularly favorable applications including clothing, upholstery and industrial nylon yarn. They also provide valuable reinforcing material of rubber employed in various belts, tire cord, conveyor belt, etc.

Hereinafter the invention will be explained more specifically with reference to working examples given below.

In the examples, the L-value of reflectivity used as the norm of evaluating the degree of coloring of nylon compositions with copper complex salt was measured as follows: the polymer chips were sprinkled with finely pulverized copper complex salt of the amount corresponding to 100 p.p.m. of copper, and placed in a test tube of 25 mm. in diameter, to be molten at 290° C. for 15 minutes in nitrogen current under stirring, and shaped into a rod-formed test piece of 2.5 mm. in thickness. The test piece was first evaluated with naked eye, and then its reflectivity to C light source (outdoors daylight) was measured with Color Machine CM–20 color-difference meter (product of Color Machine Co., Ltd.) as the index value with that of magnesium oxide plate being defined as 100.

EXAMPLE 1

9.9 grams of cuprous chloride (CuCl) and 100 g. of potassium chloride (KCl) were dissolved in 500 ml. of acetone. To the solution then 13.6 g. of m-xylylenediamine $[C_6H_4(CH_2NH_2)_2]$, (the amount corresponding to 1 mol per mol of cuprous chloride) was added under stirring. Thus a light blue precipitate was obtained. The subsequently dried reaction product contained 20.2 wt. percent of copper. The theoretical copper content of the reaction product, $KCu[C_6H_4(CH_2NH_2)]Cl_2$, is 20.5 wt. percent. This copper complex salt was washed with acetone, dried and finely pulverized, and 0.037 wt. percent thereof corresponding to 100 p.p.m. of copper was sprinkled onto nylon-6 chips (relative viscosity: 3.2). Thus sprinkled chip were molten in a test tube of 25 mm. in diameter, to be formed into a test piece of nylon-6. As a control, another nylon-6 test piece was formed in identical manner, except that no copper complex salt was added. The L-values measured with the color-difference meter were, 74.4% for the former and 74.7% for the latter. Thus it was confirmed that the two test pieces had substantially equal color properties.

EXAMPLE 2

A cuprous complex salt obtained in identical manner with Example 1 except that m-xylylenediamine was replaced by p-xylylenediamine, was added to nylon-6, and a similar test piece was prepared from the composition. The L-value of the test piece was 73.9%. Thus the test piece neither showed any substantial coloring in comparison with the control test piece.

EXAMPLE 3

300 grams of potassium iodide (KI) and 9.5 g. of cuprous iodide (CuI) were dissolved in 500 ml. of distilled water of 60° C. Then 6.8 g. of o-xylylenediamine $([C_6H_4(CH_2NH_2)_2])$, the amount corresponding to 1 mol per mol of cuprous iodide) was gradually added to the solution under stirring. The resulting grey precipitate was washed with ethanol, dried, and finely pulverized. This reaction product had a copper content of 19.5 wt. percent. The theoretical copper content of the product, $$Cu[C_6H_4(CH_2NH_2)_2]I$$

is 19.4 wt. percent.

This complex salt was added to nylon-6 in the manner similar to Example 1, except that 0.041 wt. percent (100 p.p.m. as copper) thereof was used, and the resulting composition was similarly formed into a test piece which had a L-value of 74.1%. The test piece again showed no objectionable coloring compared with the control test piece.

Controls 1–9

Nylon-6 test pieces were prepared from various nylon-6 compositions to which each 100 p.p.m. as copper of various copper salts outside the scope of this invention were added, in the manner similar to Example 1. Degrees of their coloring were measured in the identical manner, with the results as indicated in Table 1 below. Thus, all the test pieces showed appreciable coloring compared with the nylon-6 test piece containing no copper salt.

TABLE 1

| Control Number | Copper salt | L-value (percent) | Amount corres. to 100 p.p.m. of Cu (wt. percent) |
|---|---|---|---|
| 1 | Cupric acetate | 35.4 | 0.028 |
| 2 | Cuprous bromide | 37.0 | 0.022 |
| 3 | Cuprous chloride | 65.2 | 0.015 |
| 4 | Copper sulfate | 63.2 | 0.036 |
| 5 | Copper benzoate | 67.8 | 0.029 |
| 6 | Copper terephthalate | 67.0 | 0.046 |
| 7 | m-Xylylenediamine-copper acetate complex salt. | 33.9 | 0.050 |
| 8 | Ethylenediamine-copper acetate complex salt. | 34.2 | 0.047 |
| 9 | | 74.7 | |

EXAMPLE 4

To nylon-6 chips (relative viscosity: 3.2), 0.04 wt. percent of cuprous chloride-m-xylylenediamine complex salt was added, and the composition was melt-spun through a hot plate type melt-spinning machine to provide yarn of 210 deniers-15 filaments. The spinning temperature was 290° C., spinning speed was 700 m./min., and the temperature and humidity conditions of winding room were 30° C. and 35% RH. Thus obtained undrawn filaments were stretched by 4.2 times in a drawing room of 29° C. and 40% RH, with a hot plate of 190° C. to form drawn yarn of 210 deniers-15 filaments. The yarn had a tenacity of 8.2 g./d., an elongation of 23.5%, and showed substantially no coloring compared with the similarly prepared yarn to which no copper complex salt was added. The tenacity retention of the yarn after 4 hours' heat stability test at 180° C. was 93%, while that of the ordinary nylon-6 yarn containing no copper complex salt was only 28%.

EXAMPLE 5

0.037 percent by weight of the cuprous chloride complex salt of p-xylylenediamine used in Example 2, and 0.041 wt. percent of the cuprous iodide complex salt of o-xylylenediamine used in Example 3, were each sprinkled onto nylon-6, 10 chips in the similar manner to Examples 2 and 3, and the compositions were formed into nylon-6,10 test pieces. Also as the control, similar nylon-6,10 test piece, to which no copper complex salt was added, was prepared.

The L-values of the first two test pieces were, respectively, 69.9% and 69.6%. Whereas, that of the control test piect was 70.1%. Thus, substantially no coloring was brought about by the addition of the specified copper complex salts.

EXAMPLE 6

To nylon-6,6 chips (relative viscosity: 2.9), 0.05 wt. percent of cuprous iodide-mixed xylylenediamine complex salt (m-xylylenediamine: 70%, p-xylylenediamine: 30%) was added, and the cosposition was formed into 210 deniers-24 filaments drawn yarn under identical conditions as of Example 4. (The copper content of the copper complex salt employed in this Example was 19.5 wt. percent, while the theoretical copper content of cuprous iodide-xylylenediamine complex salt, $Cu[C_6H_4(CH_2NH_2)_2]I$ is 19.5 wt. percent.) No coloring was recognizable on thus obtained drawn yarn, compared with the ordinary nylon-6,6 yarn to which no copper complex salt was added. The yarn had a tenacity of 7.8 g./d., an elongation of 18.1%, and a tenacity retention of 92% after a heat stability test of 4 hours at 180° C. In contrast thereto, the ordinary nylon-6,6 yarn showed a tenacity retention of only 65% after the same test.

EXAMPLE 7

Nylon-12 chips (relative viscosity: 2.2) was mixed with 0.05 wt. percent of cuprous iodide-mixed xylylenediamine complex salt employed in Example 6 and, separately, 0.03 wt. percent of cuprous iodide (in both cases 100 p.p.m. as copper), and shaped into nylon-12 test pieces.

The former test piece, i.e., that mixed with cuprous iodide-mixed xylylenediamine complex salt, was white and had an L-value of 74.2%. Whereas, the latter was colored light blue, and had an L-value of 63.5%. The ordinary nylon-12 test piece containing no copper salt was white and had an L-value of 74.6%. Thus, when cuprous iodide was used as a complex salt with xylylenediamine, the coloring of nylon-12 polymer with Cu ion can be prevented.

EXAMPLE 8

During the polymerization of nylon-6 chips (relative viscosity: 2.6) containing 0.4 wt. percent of titanium oxide, 200 p.p.m. of cuprous iodide-m-xylylenediamine complex salt was added to 90% aqueous solution of ε-caprolactam. The resulting chips were white, and showed no appreciable coloring.

The chips were shaped into 70 denier-24 filaments drawn yarn in the known manner, and treated with Fade-Ometer for 100 hours, showing a tenacity retention of 86%. In contrast thereto, the nylon-6 yarn to which no copper complex salt was added showed a tenacity retention of only 30%. Again, when the samples were heated at 180° C. for 5 minutes, the latter was colored yellowish brown, while no color change occurred in the former.

Controls 10–18

210 deniers-15 filaments nylon-6 filamentary yarns were prepared similarly to Example 4, except that the copper complex salt was replaced by the various copper salts employed in Controls 1–9 in each run. It was confirmed that in all runs the yarns were colored light blue or light, reddish violet.

EXAMPLES 9–11 and Controls 19–24

Hygroscopic behavior of various copper complex salts were examined in those examples and controls.

The copper complex salts were allowed to stand 24 hours under the ambient conditions of 25° C. and 60% RH, to be examined of their hygroscopic property. The results confirmed that the complex salts of cuprous halogenides with xylylenediamine have less hygroscopicity and are more stable, as indicated in Table 2 below.

Cupric halogenides-m-xylylenediamine complex salts are somewhat less preferable due to their greater hygroscopicity. Since it is obvious that in melt-spinning of nylon the material chips must be dry, such additive of high hygroscopicity is undesirable.

TABLE 2

| | Copper complex salt | Hygroscopicity (percent) | Remarks |
|---|---|---|---|
| Control No.: | | | |
| 19 | Copper acetate-hexylamine complex salt. | 0.50 | Deliquescent. |
| 20 | Copper acetate-hexamethylenediamine complex salt. | 5.5 | |
| 21 | Copper acetate-ethylenediamine complex salt. | 2.4 | |
| 22 | Copper acetate-m-xylylenediamine complex salt. | 1.0 | |
| 23 | Cupric chloride-ε-caprolactam complex salt. | 0.40 | |
| 24 | Cupric chloride-ethylenediamine complex salt. | 1.2 | |
| Example: | | | |
| 9 | Cupric chloride-m-xylylenediamine complex salt. | 6.3 | |
| 10 | Cuprous chloride-m-xylylenediamine complex salt. | 0.25 | Low hygroscopicity. |
| 11 | Cuprous iodide-m-xylylenediamine complex salt. | 0.10 | |

EXAMPLE 12

17.0 grams of cupric chloride ($CuCl_2 \cdot 2H_2O$) was dissolved in 500 ml. of ethanol, and to the solution 13.6 g. of m-xylylenediamine [$C_6H_4(CH_2NH_2)_2$, the amount corresponding to 1 mol per mol of cupric chloride] was added under stirring. The reaction product obtained as light blue precipitate had a copper content of, on dry basis, 24.0 wt. percent, while the theoretical copper content of the reaction product, [$C_6H_4(CH_2NH_2)_2Cu]Cl_2$, is 23.5 wt. percent. The dried precipitate was finely pulverized, and 0.027 wt. percent thereof corresponding to 100 p.p.m. as copper was sprinkled onto nylon-6 chips (relative viscosity: 3.2). The composition was put into a test tube of 25 mm. in diameter, molten by heating at 290° C. for 15 minutes, and shaped into a test piece. Also a control test piece was similarly formed from the same nylon-6 alone. The L-values measured with the color-difference meter were, respectively, 74.08% and 74.10%. Thus the nylon composition in accordance with the invention was confirmed to possess the whiteness (reflectivity) substantially equal with that of nylon-6 test piece containing no copper complex salt.

EXAMPLE 13

Example 12 was repeated except that in the preparation of cupric chloride complex salt, m-xylylenediamine was replaced by p-xylylenediamine. The resulting test piece had an L-value of 73.7%. This sample similarly showed no appreciable coloring when compared with the control nylon-6 test piece mentioned in Example 12.

Controls 25–35

Nylon-6 compositions to which had been added varied copper salts not within the scope of this invention were formed into test pieces similarly to Example 12. In all runs the amount of copper salt added was 100 p.p.m. as copper. Upon comparison, most of the test pieces showed heavy coloring quite distinguishable from the ordinary nylon-6 test piece containing no copper salt. The results were as given in Table 3 below.

TABLE 3

| Control Number | Copper Salt | L-Value (percent) | Amount of copper salt corres. to 100 p.p.m. of Cu (wt. percent) |
|---|---|---|---|
| 25 | Cupric acetate | 35.4 | 0.028 |
| 26 | Cuprous chloride | 65.2 | 0.015 |
| 27 | Cupric chloride | 67.2 | 0.041 |
| 28 | Cuprous bromide | 37.0 | 0.022 |
| 29 | Copper terephthalate | 67.0 | 0.046 |
| 30 | Copper acetate-m-xylylenediamine complex salt. | 33.9 | 0.050 |
| 31 | Cupric chloride-ethylenediamine complex salt. | 68.9 | 0.040 |
| 32 | Cupric chloride-cyclohexylamine complex salt. | 67.8 | 0.048 |
| 33 | Cupric chloride-ethylenetetramine complex salt. | 68.7 | 0.037 |
| 34 | Cupric bromide-phenylenediamine complex salt. | 50.5 | 0.060 |
| 35 | | 74.10 | |

EXAMPLE 14

To nylon-6 chips (relative viscosity: 3.3), 0.03 wt. percent of cupric chloride-mixed xylylenediamine complex salt (m-xylylenediamine: 70%, p-xylylenediamine: 30%) was added, and the composition was melt-spun through a hot plate type melt-spinning machine to form 210 denier-24 filaments. The spinning temperature was 290° C., spinning rate was 450 m./min., and ambient conditions of the winding room were 30° C. and 35% RH. Thus wound undrawn filaments were stretched by 4.6 times in a drawing room of 29° C. and 40% RH, with a hot plate of 190° C. Thus obtained 210 deniers-24 filaments drawn yarn had a tenacity of 8.4 g./d., an elongation of 21.0%, and showed substantially no coloring when compared with ordinary nylon-6 yarn. The tenacity retention of the yarn after 4 hours' heat stability test at 180° C. was 92%, while that of the ordinary yarn was only 31%.

EXAMPLE 15

To nylon-6,6 chips (relative viscosity: 2.85) 0.05 wt. percent of cupric bromide-m-xylylenediamine complex salt was added, and the composition was processed similarly to Example 14 to provide drawn yarn of 210 deniers-17 filaments. No coloring was recognizable on the drawn yarn when compared with ordinary nylon-6,6 yarn to which no copper complex salt was added. The yarn had a tenacity of 7.7 g./d., an elongation of 18.5%, and a tenacity retention of 92% after 4 hours' heat stability test at 180° C. The ordinary yarn spun and drawn under identical conditions showed the tenacity retention of 42.2%.

EXAMPLE 16

During polymerization of nylon-6 chips (relative viscosity: 2.6) containing 0.3 wt. percent of titanium oxide, 0.005 wt. percent of cupric chloride-m-xylylenediamine complex salt was added to the 95% aqueous solution of ε-caprolactam. The resulting polymer chips were white, no objectionable coloring being recognizable. When the polymer was spun into nylon-6 filamentary yarn of 70 deniers-3,4 filaments in the known manner and treated with Fade-Ometer for 100 hours, the yarn showed a tenacity retention of 88%. The control yarn containing no copper complex salt had a tenacity retention of only 38% in the same test. The samples were also heated at 180° C. for 5 minutes. The control yarn was colored yellowish brown, but the yarn of this example showed no color change.

Controls 36-46

Nylon-6 filamentary yarns of 210 deniers-17 filaments were prepared under addition of various copper salts not within the scope of this invention as specified in Controls 25 through 35. The spinning and drawing conditions were same to those of Example 14. It was thereby confirmed that all the yarns were colored to various shades ranging from light blue to light, reddish violet.

EXAMPLE 17

Nylon-6 chips were melt-spun at 280° C. through an extruder type melt-spinning machine, for the formation of 840 deniers-60 filaments yarn. Preceding the spinning, 0.05 wt. percent of cuprous iodide-m-xylylenediamine complex salt, and 0.05 wt. percent of tetrakis [3-(4-hydroxy-3,5-di-t-butylphenyl)propionyloxymethyl] methane as a hindered phenol were added to the chips. The resulting undrawn yarn was drawn with hot plate of 190° C., and thus nylon-6 filamentary yarn of 840 deniers-60 filaments free from any coloring was obtained. The yarn had a tenacity of 8.5 g./d., an elongation of 22.6%, and a tenacity retention of 95% after 4 hours' relaxed heat treatment in air at 180° C. Whereas, ordinary nylon-6 yarn to which neither cuprous halogenide-m-xylylenediamine complex salt nor hindered phenol were added was colored yellowish brown by the same heat treatment, and showed a tenacity retention of only 30%.

EXAMPLE 18

Example 17 was repeated except no hindered phenol was added. Very light, greenish color tone was discernible on the product when the bundle of several strands of the yarn was observed. Similarly, when the cuprous iodide-m-xylylenediamine complex salt was replaced by cuprous chloride-m-xylylenediamine complex salt, but no hindered phenol was added, very light bluish color tone was observed. The coloring was completely prevented, however, by the concurrent use with the complex salt of tetrakis [3-(4-hydroxy-3,5-t-butylphenyl)propionyloxymethyl] methane as a hindered phenol. Evaluation of coloring was rather difficult, but clear comparison was possible by observation of the yarn bundle from axial direction of the yarn. That is, the nylon yarn containing tetrakis [3-(4-hydroxy-3,5-t-butylphenyl)propionyloxymethyl] methane and cuprous halogenide-m-xylylenediamine complex salt appeared light grey or light yellow, but the yarn containing the copper complex salt alone exhibited the light blue or light green color characteristic to copper ion.

EXAMPLE 19

During pressurized polymerization of hexamethylene-diammonium adipate, 0.3 wt. percent of titanium oxide slurry was added to the polymerization system, at 30 minutes after the heating was started. Further 15 minutes thereafter, 0.0015 wt. percent of cuprous chloride-p-xylylenediamine complex salt and 0.02 wt. percent of 2,4,6-tris(4-hydroxy-3,5-di-t-butylbenzyl) - 1,3,5-trimethylbenzene as a hindered phenol were added to the system as suspended in distilled water. The copper content of said complex salt was 20.2 wt. percent, while the theoretical copper content of $K[CuC_6H_4(CH_2NH_2)_2]Cl_2$ is 20.5 wt. percent. Consuming each two hours for each stage of pressure elevation, control and release, the polymerization was performed at the controlled pressure of 20 kg./cm.$^2$, to produce nylon-6,6 chips having a relative viscosity of 2.6. The chips were perfectly white. They were melt-spun through a conventional melt-spinning machine at 300° C., and formed into white nylon-6,6 filamentary drawn yarn of 70 deniers-34 filaments. When the yarn was heat-treated at 180° C. for 30 minutes, it developed no appreciable color and showed a tenacity retention of 98%. In contrast thereto, ordinary nylon-6,6 filamentary yarn to which no copper complex salt or hindered phenol was added turned yellow after the same heat treatment, and showed a tenacity retention of 47%.

EXAMPLE 20

Nineteen (19) g. of cuprous iodide (CuI) was dissolved in 500 ml. of an aqueous solution containing 150 g. of potassium iodide (KI). Then 13.6 g. of m-xylylenediamine $[C_6H_4(CH_2NH_2)_2]$ was added to the system, to form light grey precipitate which was an equimolar reaction product of cuprous iodide and m-xylylenediamine. The copper content of the reaction product after ethanol-washing and drying was 19.8 wt. percent, while the theoretical copper content of $CuC_6H_4(CH_2NH_2)_2I$ is 19.5 wt. percent.

To nylon-6 chips (relative viscosity: 3.4), 0.043 wt. percent of the above copper complex salt and 0.1 wt. percent of 4,4'-methylenebis(5-methyl-2-t-butylphenol) as a hindered phenol were added. The resulting composition was melted at 290° C. and formed into a test piece similarly to the preceding examples. The test piece was entirely free from coloring, and had an L-value of 74.5%, while that of the control test piece containing no copper halogenide-xylylenediamine complex salt or hindered phenol was 74.7%. Thus no difference in coloring property was recognized in the nylon article of this example, when compared with ordinary nylon.

EXAMPLES 21-23 and
Controls 47-49

To the nylon-6 employed in Example 20, various m-xylylenediamine-copper complex salts and tetrakis [3-(4-hydroxy - 3,5-di-t-butylphenyl)propionyloxymethyl] methane were added in the manner similar to Example 20. Comparing the products, it was observed that the cuprous halogenide complex salts within the scope of this invention caused substantially no coloring of nylon. The results were as given in Table 4 below.

TABLE 4

| Copper complex salt | | L-Value (percent) | Amount of copper complex salt corres. to 100 p.p.m. of Cu (wt. percent) |
|---|---|---|---|
| Example No.: | | | |
| 21 | Cuprous chloride-m-xylylenediamine | 74.5 | 0.037 |
| 22 | Cuprous bromide-m-xylylenediamine | 69.8 | 0.044 |
| 23 | Cuprous iodide-m-xylylenediamine | 74.2 | 0.035 |
| Control: | | | |
| 47 | Copper acetate-m-xylylenediamine | 33.9 | 0.050 |
| 48 | Copper phosphate-m-xylylenediamine | 58.5 | 0.075 |
| 49 | | 74.7 | |

EXAMPLES 24–26 and Control 50

To nylon-6 chips (relative viscosity: 3.3), additives varied for each run were added as follows:

(I) 0.05 wt. percent of cupric chloride-m-xyxylenediamine complex salt, (II) 0.05 wt. percent of same complex salt of (I) and 0.1 wt. percent of tetrakis [3 - (4 - hydroxy - 3,5-t-butylphenyl)propionyloxymethyl]methane, and (III) 0.05 wt. percent of same complex salt of (I) and 0.1 wt. percent of 2,4,6-tris(4-hydroxy-3,5-t-butylbenzyl)-1,3,5-trimethylbenzene.

All the compositions were then spun and drawn similarly to Example 20, to provide nylon-6 filamentary yarns of 210 deniers-24 filaments.

The strength-elongation characteristics and tenacity retention after 4 hours' heat stability test at 180° C. of the drawn yarns were as indicated in Table 5 below.

TABLE 5

| | Additives | Tenacity (g./d.) | Elongation (percent) | Tenacity retention (percent) |
|---|---|---|---|---|
| Control 50 | | 8.4 | 20.9 | 31 |
| Example: | | | | |
| 24 | I | 8.4 | 21.2 | 93 |
| 25 | II | 8.6 | 22.2 | 95 |
| 26 | III | 8.5 | 21.5 | 93 |

When tetrakis[3 - (4-hydroxy-3,5-t-butylphenyl)propionyloxymethyl]methane, or 2,4,6 - tris(4-hydroxy-3,5-t-butylbenzyl)-1,3,5-trimethylbenzene was used concurrently with cupric chloride-m-xylylenediamine complex salt, the products' strength-elongation characteristics and heat stability showed no remarkable change. However, color tone of the drawn yarns was improved, i.e., the whiteness was still improved. In the yarn to which the copper complex salt alone had been added, light blue or green color characteristic to copper ion was very slightly recognizable, but when hindered phenol was concurrently used with the salt, any slight coloring was completely eliminated.

We claim:

1. A stabilized polyamide composition comprising a polyamide selected from the group consisting of polycaprolactam, polyhexamethylene adipamide, polydodecalactam and polyhexamethylene sebacamide and as the stabilizer therefor, a copper complex formed by the precipitation in a suitable solvent of the reaction product of either (a) one mole of cuprous iodide, chloride or bromide with one mole of a xylenediamine, or (b) one mole of cupric iodide, chloride or bromide with one or two moles of a xylenediamine.

2. A stabilized polyamide composition comprising a polyamide selected from the group consisting of polycaprolactam, polyhexamethylene adipamide, polydodecalactam and polyhexamethylene sebacamide and as the stabilizer therefor, 0.0001 to 0.3% based on the weight of the polyamide of a copper complex formed by the precipitation in a suitable solvent of the reaction product of either (a) one mole of cuprous iodide, chloride or bromide with one mole of a xylenediamine or (b) one mole of cupric iodide, chloride or bromide with one or two moles of a xylenediamine.

3. The composition of claim 1, in which the copper halide is cuprous chloride.

4. The composition of claim 1, in which the copper halide is cuprous bromide.

5. The composition of claim 1, in which the copper halide is cuprous iodide.

6. The composition of claim 1, in which the copper halide is cupric chloride.

7. The composition of claim 1, in which the copper halide is cupric bromide.

8. The composition of claim 1, in which the xylylenediamine is o-xylylenediamine.

9. The composition of claim 1, in which the xylylenediamine is m-xylylenediamine.

10. The composition of claim 1, in which the xylylenediamine is p-xylylenediamine.

11. A stabilized polyamide composition comprising a polyamide selected from the group consisting of polycaprolactam, polyhexamethylene adipamide, polydodecalactam and polyhexamethylene sebacamide and as the stabilizer therefor, a hindered phenol and a copper complex formed by precipitation in a suitable solvent of the reaction product of either (a) one mole of cuprous iodide, chloride or bromide with one mole of a xylenediamine, or (b) one mole of a cupric iodide, chloride or bromide with one or two moles of a xylenediamine.

12. A stabilized polyamide composition comprising a polyamide selected from the group consisting of polycaprolactam, polyhexamethylene adipamide, polydodecalactam and polyhexamethylene sebacamide and as the stabilizer therefor, 0.005 to 0.3% based on the weight of the polyamide of a hindered phenol and 0.0001 to 0.3% based on the weight of the polyamide of a copper complex formed by precipitation in a suitable solvent of the reaction product of either (a) one mole of cuprous iodide, chloride or bromide with one mole of a xylenediamine, or (b) one mole of a cupric iodide, chloride or bromide with one or two moles of a xylenediamine.

13. The composition of claim 11, in which the hindered phenol has at least two benzene rings, at least two phenolic hydroxyl groups, and a molecular weight of at least 200.

14. The composition of claim 11, in which the hindered phenol is 2,2' - ethylidene-bis(4-methyl-6-t-butylphenol).

15. The composition of claim 11, in which the hindered phenol is 4,4' - methylene-bis(5-methyl-2-t-butylphenol).

16. The composition of claim 11, in which the hindered phenol is 4,4'-dihydroxydiphenylcyclohexane.

17. The composition of claim 11, in which the hindered phenol is 1,1,3-tris(4-hydroxy-6-methyl-3-t-butylphenyl)butane.

18. The composition of claim 11, in which the hindered phenol is tetrakis[3-(4-hydroxy-3,5-di-t-butylphenyl)propionyloxymethyl]methane.

19. The composition of claim 11, in which the hindered phenol is 2,4,6-tris(4-hydroxy-3,5-di-t-butylbenzyl)-1,3,5-trimethylbenzene.

References Cited

FOREIGN PATENTS 1,030,363   5/1966   Great Britain _____ 260—45.75

DONALD E. CZAJA, Primary Examiner

V. P. HOKE, Assistant Examiner

U.S. Cl. X.R.

260—45.95 R

S-493

UNITED STATES PATENT OFFICE
CERTIFICATE OF CORRECTION

Patent No. 3,639,335         Dated February 1, 1972

Inventor(s) FUJII ET AL

It is certified that error appears in the above-identified patent and that said Letters Patent are hereby corrected as shown below:

Page 4, in Table 3, under Control No. 33, insert -- tri -- after "chloride".

Signed and sealed this 6th day of June 1972.

(SEAL)
Attest:

EDWARD M. FLETCHER, JR.                ROBERT GOTTSCHALK
Attesting Officer                       Commissioner of Patents